United States Patent [19]
Holloway

[11] Patent Number: 5,845,822
[45] Date of Patent: Dec. 8, 1998

[54] INERTIA-ACTIVATED DISPENSER FOR INSECTICIDE

[76] Inventor: James Michael Holloway, Rte. 2, Box 27, Whitewright, Tex. 75491

[21] Appl. No.: 873,808

[22] Filed: Jun. 12, 1997

[51] Int. Cl.⁶ .................................................. A01C 15/02
[52] U.S. Cl. .......................... 222/500; 222/518; 222/175; 111/106; 111/50; 111/72; 111/92
[58] Field of Search ..................................... 222/500, 518, 222/200, 196, 175, 465.1; 239/288, 142; 111/106, 50, 72, 92

[56] References Cited

U.S. PATENT DOCUMENTS

| 358,693 | 3/1887 | Parks | 239/142 |
|---|---|---|---|
| 495,654 | 4/1893 | Bartholomew | 222/200 |
| 1,611,388 | 12/1926 | Stewart | 222/196 |
| 5,101,744 | 4/1992 | Nolan | 111/95 |

*Primary Examiner*—Andres Kashnikow
*Assistant Examiner*—David Deal
*Attorney, Agent, or Firm*—Jerry C. Ray

[57] ABSTRACT

A dispenser or applicator for dry insecticide includes a container having a removable cover; the cover is attached to a lower end of an elongate handle having a hand grip at its top A partition inside the container is the floor of the insecticide container, with a skirt extending below the partition; insecticide is dispensed through apertures in the container floor. These apertures are normally closed by a spring-biased stopper disk having tapered fingers which protrude through the apertures; the stopper disk is moved to an open position by inertia when the container is struck against the ground, unblocking the apertures and allowing a measure of insecticide to escape before the stopper disk rebounds to its closed position. Walls of the so container housing extend below the apertures to form a skirt which prevents scattering or dispersal of the powder.

9 Claims, 3 Drawing Sheets

( VIEW 1-1 )

( VIEW 1-1 )

INERTIA-ACTIVATED DISPENSER FOR INSECTICIDE

CROSS REFERENCE TO RELATED APPLICATIONS

None.

BACKGROUND OF THE INVENTION

1. Field of the Invention

This invention relates to dispensers for dry insecticide, and in particular to such dispensers having an opening through which insecticide is released when the container is struck against a solid object.

2. Description of the Related Art

Ants and other ground-dwelling insects are a significant problem in many parts of the country. An aggressive breed known as fire ants are a particular problem in the South. The most common method of treating fire ants and other ants is the application of a dry insecticide, in powdered form or as granules, to the beds. These poisons are generally slow-acting, so that ants which swarm to the surface of the bed will come in contact with the powder and transport it back into the below-ground nest. There the poison can kill the queen and other ants in the nest, so that the entire colony is destroyed.

Treating ant beds with powder often results in the powder being scattering onto clothes or skin, and sometimes results in the user being stung by the insects. What is needed is a dispenser for powdered insecticide which allows the user to remain a safe distance from the ant mound, and which places an appropriate amount of insecticide on the target area, while the powder from being blown away on the wind.

SUMMARY OF THE INVENTION

The present invention is a dry insecticide dispenser which allows the user, while standing or while on a riding lawn mower, to place a predetermined quantity of insecticide on an ant mound. A container or canister for the insecticide includes a housing with a removable cover; the cover is attached to an elongate handle. Within the housing is a partition which separates an insecticide container in the upper part of the housing from a skirt formed by the lower part of the housing. Apertures in the partition are normally closed by a spring-biased stopper which opens momentarily due to inertia when the dispenser is struck or tapped against the ground, allowing a predetermined amount of dry insecticide to escape the container and to settle on the ground within the area protected by the lower skirt of the dispenser.

It is an object of this invention to provide an applicator for dispensing a measured amount of powdered or other dry insecticide.

Another object is to provide a dry insecticide applicator which does not subject the user to attack by insects such as ants.

A further object is to provide a dry insecticide dispenser which will deposit powdered insecticide on the ground while protecting the powder from dispersal by the wind.

Further objects are to achieve the above with devices that are sturdy, compact, durable, lightweight, simple, safe, efficient, and reliable, yet inexpensive and easy to manufacture, operate, and maintain.

The specific nature of the invention, as well as other objects, uses, and advantages will clearly appear from the following description and from the accompanying drawings, the different views of which are not necessarily scale drawings.

CATALOG OF THE ELEMENTS

To aid in the correlation of the elements of the invention to the exemplary drawings, the following catalog of the elements is provided:

| 10 | handle | 22 | stopper |
|----|--------|----|---------|
| 12 | grip | 24 | central post |
| 14 | housing | 26 | spring |
| 15 | cover | 28 | finger |
| 16 | container | 30 | skirt |
| 18 | floor | 32 | vent |
| 20 | aperture | | |

DESCRIPTION OF THE PREFERRED EMBODIMENTS

Figures 1, 2:
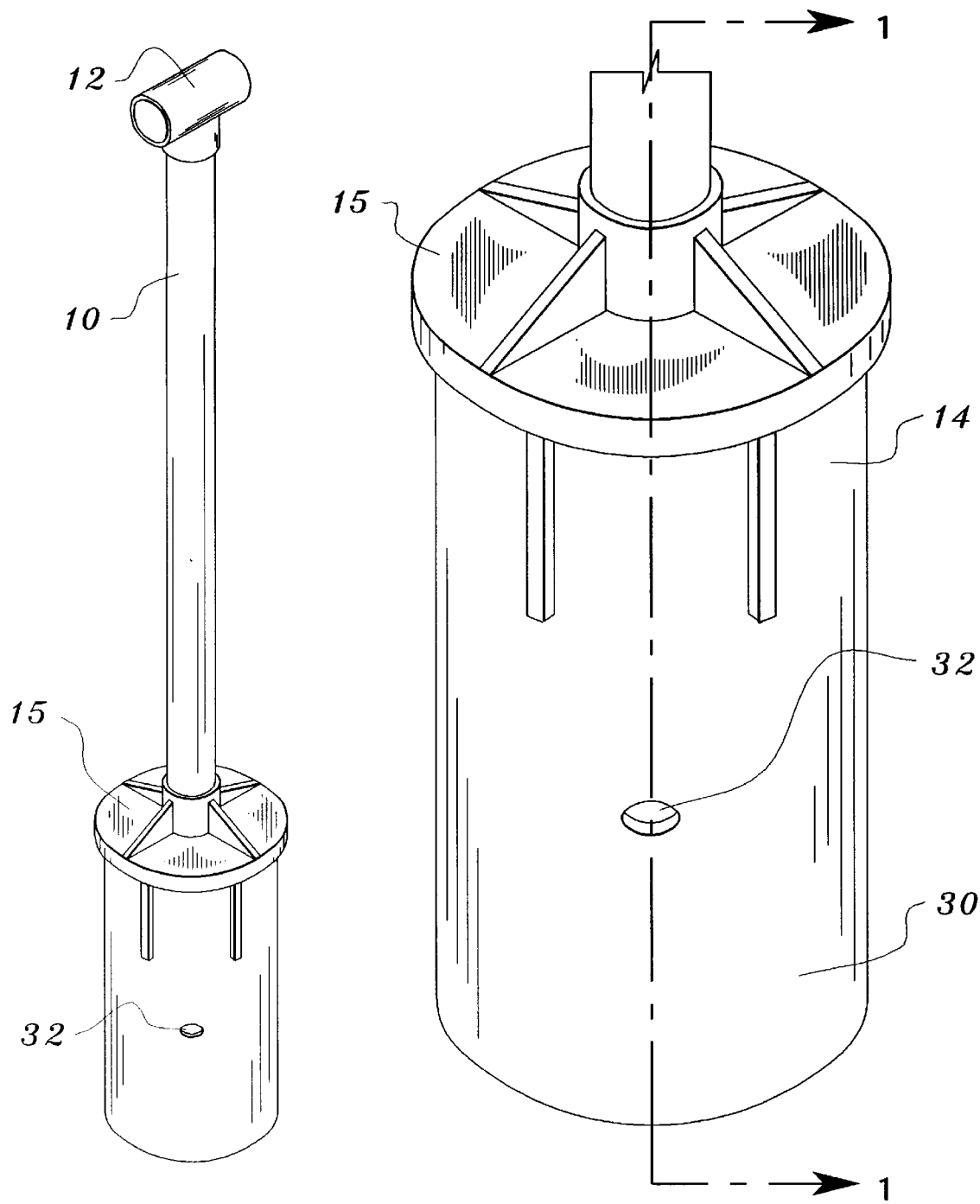
FIG. 1 is a top front perspective view of the insecticide dispenser.
FIG. 2 is an enlarged perspective of the container and its cover.
Figure 3:
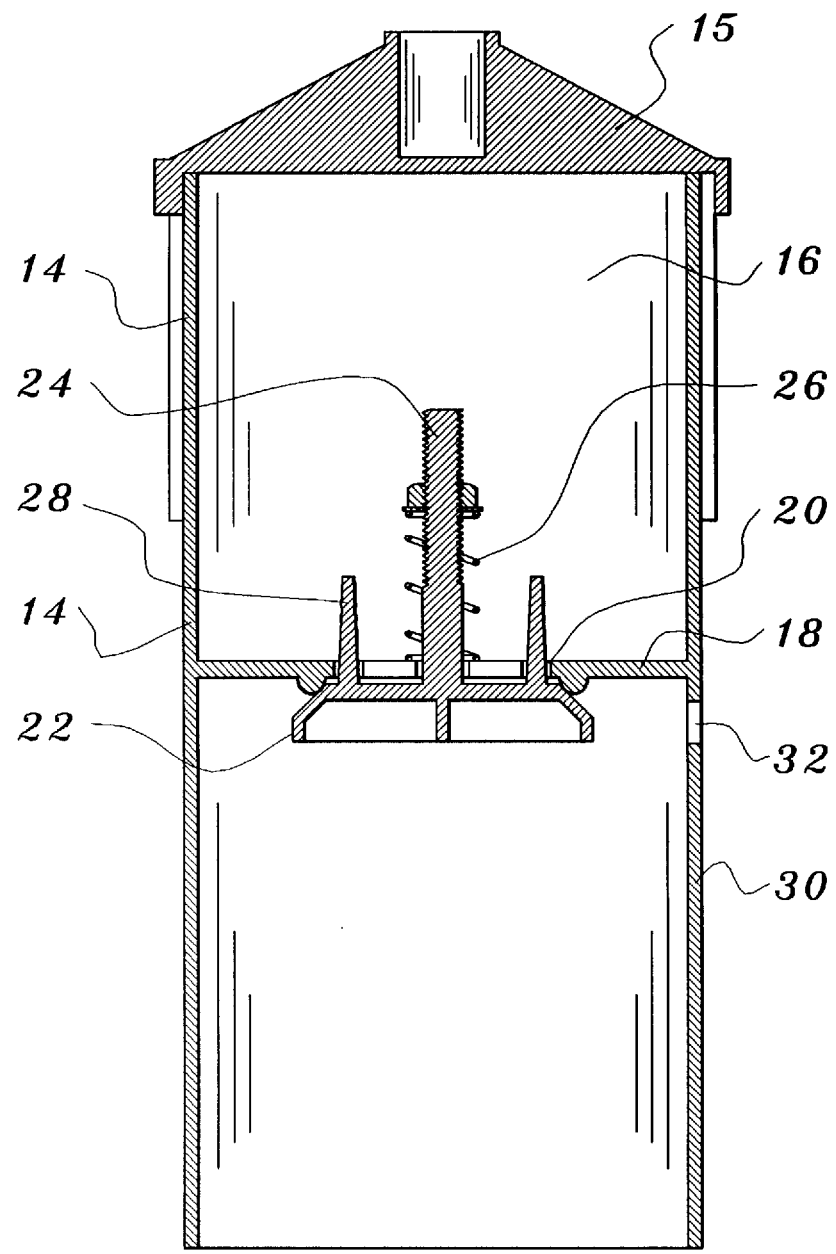
FIG. 3 is a cross section through view 1—1 of FIG. 1, showing the stopper and bias spring.

Referring to the drawings, FIG. 1 and FIG. 2 illustrate a dispenser for dry insecticide in powder form or in granules. Dry insecticide is sometimes referred to herein as "powder." An elongate handle 10 includes a grip 12 for holding and carrying the dispenser; at its lower end, the handle 10 is attached to a removable cover 15 which attaches to the top of housing 14. Housing is used herein to mean a case or enclosure. Housing 14 is generally cylindrical, and cover 15 attaches by means of twist-lock threads or by other suitable means. As shown in FIG. 3, Housing 14 has an upper portion and a lower portion divided by partition or floor 18. Floor 18 is a partition at the bottom of the housing upper portion, forming a container 16 for dry insecticide; the container is closed at its top by cover 15.

Referring still to FIG. 3, floor 18 includes one or more apertures 20 through which insecticide is dispensed. One embodiment of the invention uses four apertures, about 5/16" in diameter. The apertures 20 are normally closed by spring-biased stopper 22. Stopper 22 is a disk of plastic having a central post 24; the post is surrounded by and engaged by a biasing spring 26. Central post 24 extends through an opening in the center of floor 18, and is engaged by spring 26 so that stopper 22 is urged against a bottom surface of floor 18. Stopper 22 is positioned immediately beneath the floor and presses against the underside of the floor, blocking the apertures and keeping them normally closed.

Figure 4:
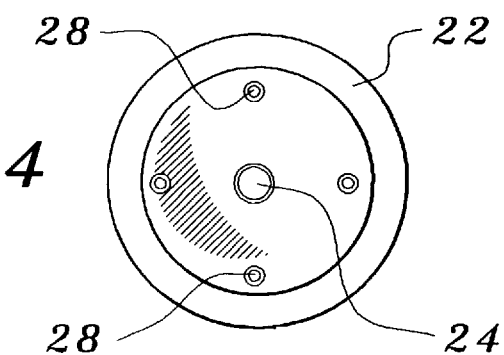
FIG. 4 is a top plan view of the stopper.
Figure 5:
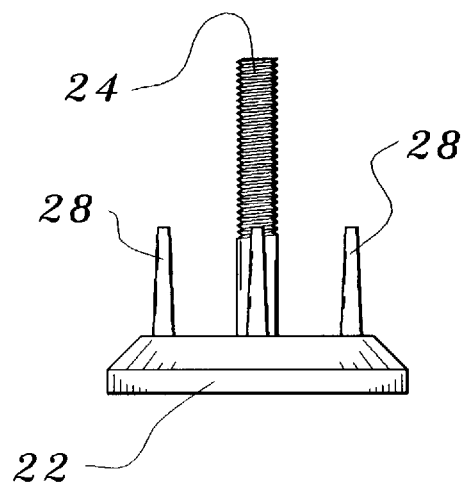
FIG. 5 is a side elevation of the stopper.
Figure 6:
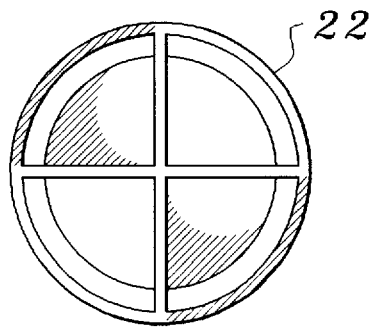
FIG. 6 is a bottom plan view of the stopper.

As shown in FIG. 4 and FIG. 5, fingers 28 are integral with stopper 22; the fingers 28 are approximately 5/8" long. In one embodiment, the stopper is injection molded of nylon or other suitable plastic with the stopper disk, central post, and fingers as one unit. Alternatively, the fingers may be glued or otherwise attached to the stopper body. FIG. 6 illustrates an embodiment of the underside of stopper 22.

Protruding through the dispensing apertures 20, the tapered fingers 28 extend into the mass of insecticide within container 16, as shown in FIG. 3. As described below, the fingers loosen and agitate the dry insecticide to keep it flowing readily. Each finger is tapered, being wider at its base than at its top; the base of each finger is approximately ⁵⁄₃₂" in diameter, or about one-half the diameter of the aperture through which it extends. Thus the fingers 28 fit loosely within the apertures, allowing the body or disk of the stopper some freedom of lateral movement.

Referring still to FIG. 3, an end turn of coiled bias spring 26 rests on a top surface of floor 18; the other end is restrained by a snap-on washer or other suitable device attached to an upper portion of central post 24. The spring is under compression, so that post 24 and stopper 22 are urged upwards; the stopper body or disc presses against a lower surface of floor 18, keeping the apertures 20 normally closed. The amount of compression on spring 26 is determined by the position of the snap-on washer and, as described below, the amount of compression on the spring determines the quantity of powder dispensed.

In operation, the dispenser is held by its handle 10 above an ant bed or other area to be treated with dry insecticide. The user moves the dispenser unit rapidly downward until the lower extremity of the skirt 30 strikes the ant bed or the adjacent ground. On striking the ground, the dispenser decelerates abruptly as its downward motion ceases. Inertia causes the stopper 22 to continue moving in the same downward direction, and its movement compresses bias spring 26. Movement of stopper 22 relative to floor 18 unblocks apertures 20, allowing some insecticide to escape the container 16. Escaping powder moves through the apertures and is scattered as it strikes the top surface of the stopper disk. The resulting cloud of insecticide is contained by the skirt 30, which prevents the powder from being blown away as it settles to the ground. When the spring is sufficiently compressed to overcome the inertial force exerted by the stopper, the stopper ceases its downward travel and is pushed by the spring back into a closed position. The result of the application is that a uniform amount of insecticide is deposited on a predetermined area of soil, i.e., the area defined by skirt 30.

In one embodiment, illustrated in FIG. 3 and FIG. 5, a threaded adjustment at the upper end of central post 24 allows the degree of compression on bias spring 26 to be changed. The post or its upper portion is threaded, and a wing nut or other type of nut is screwed onto the threaded central post to hold compression on the spring. Loosening the adjustment nut reduces compression on the spring, allowing the stopper disk to remain open longer so that a larger quantity of powder is dispensed. Tightening the nut places additional compression on the bias spring and reduces the length of time the stopper remains open, so that less powder is dispensed.

Fingers 28, when the stopper disk is in its normally closed position, extend through the apertures 20 in floor 18, into the insecticide chamber. When the dispenser is tapped against the ground, the stopper disk and the fingers move downward. Because the fingers are in contact with the powdered insecticide, motion of the fingers tends to initiate motion of the insecticide toward the apertures. In addition, because there is some rocking or side-to-side motion of the stopper and the fingers, the powder around the fingers is agitated so that it remains loose and free-flowing.

Because air inside the skirt 30 may be compressed when the dispenser is struck against the soft soil of an ant bed, an air vent 32 is provided in the skirt. In one embodiment, the vent 32 is a ⅜" opening in the upper part of the skirt, just below the partition; see FIGS. 2 and 3. The vent allows compressed air to escape from the skirt and so not interfere with downward motion of the dry insecticide through the apertures. It is understood that more than one vent opening can be used. The vent assures that the powdered insecticide is distributed uniformly and efficiently over the target area.

The restrictive description and drawing of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

I claim as my invention:

1. A dispenser for dry insecticide, comprising:
   an elongate handle,
   a container attached to a bottom end of said handle,
   a floor within said container, said floor having at least one aperture therein,
   a spring-biased stopper for said aperture, and
   said spring-biased stopper including means for agitating dry insecticide within said container.

2. The invention as described in claim 1, said means for agitating dry insecticide within said container further comprising:
   said stopper having at least one integral finger, said finger extending through one said aperture in said floor, said finger being in contact with the dry insecticide within said container so that movement of said finger agitates the insecticide.

3. The invention as described in claim 1, further comprising:
   said container including a wall, and
   a skirt including a lower portion of said wall extending below said floor.

4. The invention as described in claim 3, further comprising:
   said skirt including at least one vent in a wall thereof.

5. The invention as described in claim 1, said spring-biased stopper further comprising:
   a stopper body disposed beneath said floor and having an integral post,
   said post extending through an orifice in said floor, and
   a biasing spring engaging said post to urge said stopper body against said floor to close apertures in said floor.

6. The invention as described in claim 5, further comprising:
   said post being threaded along a portion thereof, and
   a threaded adjustment nut on said post, said adjustment nut bearing against an end of said biasing spring so that turning said adjustment changes compression on said spring.

7. The invention as described in claim 1, wherein said handle is attached to a removable cover of said container.

8. The invention as described in claim 7, further comprising:
   said container being cylindrical, and
   said container and said removable cover include twist-lock attachment means.

9. An inertia-activated dispenser for dry insecticide, comprising:
   an elongate handle having an upper end and a lower end,
   said upper end including a grip,
   a container for insecticide attached to said lower end of said handle, a floor within said container, said floor having at least one aperture therein, a spring-biased stopper for keeping said aperture normally closed, said spring-biased stopper including at least one finger attached thereto, said finger extending through said aperture to agitate said dry insecticide within said container, and a biasing spring engaging said stopper with a predetermined force to urge said stopper against said floor, so that inertia causes said stopper to momentarily compress said biasing spring to open said aperture when said container is struck against an obstruction to dispense insecticide.

* * * * *